(12) United States Patent
Xie

(10) Patent No.: US 8,123,048 B2
(45) Date of Patent: Feb. 28, 2012

(54) HYDROPHILIC POROUS MEMBRANE AND METHOD OF FORMING THE SAME

(75) Inventor: Tao Xie, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 226 days.

(21) Appl. No.: 11/341,542

(22) Filed: Jan. 27, 2006

(65) Prior Publication Data

US 2007/0175818 A1    Aug. 2, 2007

(51) Int. Cl.
*B01D 71/82* (2006.01)
*B01D 71/28* (2006.01)
*B01D 69/10* (2006.01)
*B01D 71/00* (2006.01)

(52) U.S. Cl. ............. 210/503; 210/500.27; 210/500.35; 210/500.34; 210/500.42; 427/245

(58) Field of Classification Search .................. None
See application file for complete search history.

(56) References Cited

U.S. PATENT DOCUMENTS

| 4,409,339 | A * | 10/1983 | Matsuda et al. ............... 521/143 |
| 4,505,797 | A * | 3/1985 | Hodgdon et al. .............. 204/252 |
| 4,618,533 | A | 10/1986 | Steuck |
| 4,917,793 | A | 4/1990 | Pitt et al. |
| 5,017,420 | A * | 5/1991 | Marikar et al. ............... 428/212 |
| 6,896,777 | B2 | 5/2005 | Arcella et al. |
| 6,902,676 | B2 | 6/2005 | Arcella et al. |
| 2004/0116546 | A1* | 6/2004 | Kosek et al. .................... 521/27 |
| 2004/0242714 | A1 | 12/2004 | Penezina et al. |
| 2005/0133441 | A1* | 6/2005 | Charkoudian ........... 210/500.42 |
| 2007/0134530 | A1* | 6/2007 | Nakamura et al. .............. 429/30 |

OTHER PUBLICATIONS

Electrodyalysis; Lenntech, [No Date], printed from the internet on Jun. 8, 2011 at <<http://www.lenntech.com/electrodialysis.htm>>.*

\* cited by examiner

*Primary Examiner* — Krishnan S Menon

(57) ABSTRACT

A method for forming a hydrophilic porous membrane includes applying a crosslinked coating to a hydrophobic porous membrane via an in-situ polymerization process. Polar functional groups are introduced into the coating, thereby forming the hydrophilic porous membrane.

11 Claims, 1 Drawing Sheet

HYDROPHILIC POROUS MEMBRANE AND METHOD OF FORMING THE SAME

TECHNICAL FIELD

The present disclosure relates generally to porous membranes, and more particularly to hydrophilic porous membranes and methods of forming the same.

BACKGROUND

Porous membranes are widely used as separation media in a variety of applications, including, for example, filtration and fuel cell gas diffusion paper. When porous membranes are used in aqueous environments, surface hydrophilicity on the membranes is often desirable to facilitate water transport through the membranes.

One method for incorporating hydrophilicity into porous membranes includes in-situ polymerization of hydrophilic monomers onto the substrate surface. A potential problem related to such coating deposition methods (e.g., depositing hydrophilic acrylate coatings) is that the membrane often suffers from gradual hydrophilicity loss as a result of coating loss during its use. Another potential problem with such a method is that hydrophilic monomers intrinsically do not wet hydrophobic membranes. This may lead to an uneven distribution of the hydrophilic coating over the entire surface of the hydrophobic membrane after curing takes place.

Another method for incorporating hydrophilicity into porous membranes includes surface grafting hydrophilic monomers onto a substrate. In principle, the surface grafting method may offer a solution to the coating stability problem described above, in part because of the robust chemical bonding between hydrophilic functional groups and the substrate used in the grafting method. However, the grafting method generally involves sophisticated chemistry that is highly dependant on the substrate material selected.

As such, it would be desirable to provide a simplified method for introducing substantially stable surface hydrophilicity onto porous membranes.

SUMMARY

A method for forming a hydrophilic porous membrane includes applying a crosslinked coating to a hydrophobic porous membrane via an in-situ polymerization process. Polar functional groups are introduced into the coating, thereby forming the hydrophilic porous membrane.

BRIEF DESCRIPTION OF THE DRAWINGS

Features and advantages of the present disclosure will become apparent by reference to the following detailed description and drawings, in which.

DETAILED DESCRIPTION

Embodiments of the method disclosed herein advantageously form hydrophilic membranes whose hydrophilicity is substantially more stable than membranes formed via methods that include in-situ polymerization of hydrophilic monomers. Without being bound to any theory, it is believed that because hydrophilicity is added after non-hydrophilic monomers are cured to the hydrophobic membrane surface, the non-hydrophilic monomers may better wet the hydrophobic membrane surface. It is further believed that this may lead to substantially better coverage of the coating on the membrane (e.g., little or no blockage of pores and substantially even distribution of coatings on substantially the entire surface).

The membranes formed herein may be suitable for use in a variety of applications, including, but not limited to filtration, gas diffusion (e.g., in fuel cells), and/or the like, and/or combinations thereof.

Figure 1:
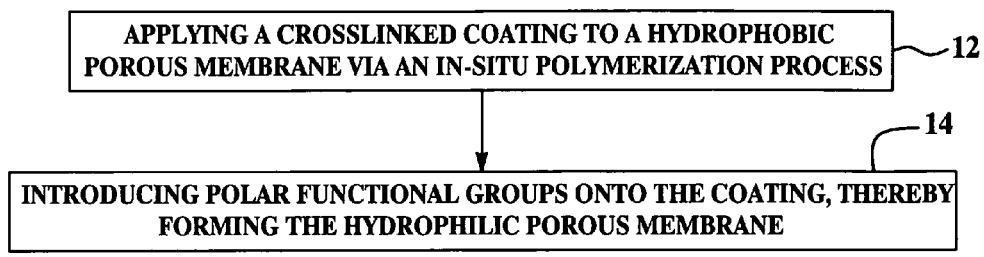
FIG. 1 is a diagram depicting an embodiment of a method for forming a hydrophilic porous membrane.

Referring now to FIG. 1, an embodiment of the method generally includes applying a crosslinked coating to a hydrophobic porous membrane, as shown at reference numeral 12. Polar functional groups (a non-limitative example of which includes ionic groups) are then introduced into the coating, thereby forming the hydrophilic porous membrane, as shown at reference numeral 14.

The hydrophobic porous membrane may be a polymeric membrane or a non-polymeric membrane. It is to be understood that the hydrophobic porous membrane is formed of a material that is capable of withstanding conditions in which polar functional groups are introduced onto the membrane (e.g., sulfonation conditions). In an embodiment, the hydrophobic porous membrane is formed of carbon fibers, polyolefin membranes, fluorinated polymers (non-limitative examples of which include poly(tetrafluoroethylene) and poly(vinylidene fluoride)), fluorinated ethylene propylene polymers, and combinations thereof. In one embodiment, the membrane may have an average pore size ranging from about 0.001 microns to about 1000 microns, and in another embodiment, the average pore size may range from about 0.1 microns to about 100 microns.

The crosslinked coating may include one or more polymers, non-limitative examples of which include vinyl polymers, polymers that can be cured via a step-wise polymerization method, and/or combinations thereof. It is to be understood that the crosslinked coating is substantially non-hydrophilic. In a non-limitative example, the crosslinked coating possesses water contact angles ranging from about 60° to about 90° when applied onto a non-porous flat surface, depending, at least in part, on the formulation of the coating.

The crosslinked coating may be formed by immersing the hydrophobic porous membrane in a mixture or solution containing monomers, crosslinker(s), and/or the like, and/or combinations thereof. In an embodiment, the monomers are non-hydrophilic monomers. Examples of suitable monomers include, but are not limited to styrene, trifluorostyrene, acrylates, itaconates, methacrylates, and/or combinations thereof.

The crosslinker(s) selected for the mixture or solution are those that form crosslinking bonds capable of maintaining chemical stability under conditions (e.g. sulfonation conditions, hydrolysis conditions for ester groups) used to introduce the polar functional groups. An example of a suitable crosslinker is divinyl benzene, which forms crosslinking bonds that remain substantially intact during the introduction of the polar groups. Examples of generally unacceptable crosslinker(s) are bis(acrylate)s with the two acrylate functionalities linked together by ester bonds which are not stable under acidic conditions—this generally leads to the destruction of the crosslinking bonds, and the resulting hydrophilic coatings may, as a result, become water soluble.

In-situ polymerization of the monomers may be initiated via ultraviolet radiation exposure, thermal exposure/curing, and/or combinations thereof. The method used for initiating polymerization may be dependent, at least in part, upon the monomers selected for the mixture. In an embodiment in which photopolymerization is used, the in-situ polymerization may occur at a temperature ranging from about 10° C. to about 120° C., or from about 20° C. to about 100° C. In an embodiment in which thermal polymerization is used, the in-situ polymerization may occur at a temperature ranging from about 40° C. to about 150° C., or from about 50° C. to about 100° C.

In an embodiment, initiators may be added to the monomer-crosslinker solution or mixture. Non-limitative examples of suitable initiators include photoinitiators and/or thermal initiators. Examples of suitable photoinitiators include, but are not limited to IRGACURE 863, IRGACURE 819 (both of which are commercially available from Ciba-Geigy Corp. located in Tarrytown, N.Y.), and LUCIRIN TPO (which is commercially available from BASF Corp., located in Florham Park, N.J.). Examples of suitable thermal initiators include, but are not limited to 2,2'-azo-bis-isobutyrylnitrile (AIBN) and benzoyl peroxide (BPO).

In an embodiment, the monomer-containing solution or mixture includes a solvent. It is to be understood, however, that the solvent is generally evaporated before in-situ polymerization occurs. The solvent may be added in desirable amounts to dilute the monomers to achieve a desirable viscosity. It is to be understood that any suitable solvent may be used. In an embodiment, the solvent is selected from isopropanol, methanol, ethanol, acetone, and combinations thereof.

After the crosslinked coating is formed on the hydrophobic porous membrane, polar functional groups are introduced onto the coating. Without being bound to any theory, it is believed that the addition of the polar functional groups introduces hydrophilicity into the coated hydrophobic porous membrane. In an embodiment, the polar functional groups are ionic or ionizable groups.

The polar functional groups may be added by soaking the coated membrane in concentrated sulfonic acid. It is to be understood that the monomer selected may dictate the type of polar functional group that is introduced onto the membrane. For example, styrene monomers treated with concentrated sulfonic acid may result in the introduction of polar functional groups (e.g., sulfonic acid groups) that are different than those polar functional groups (e.g., polar carboxylic acid groups) introduced when vinyl ester monomers are treated with concentrated sulfonic acid.

It is to be further understood that the coated membrane may be soaked for a sufficient amount of time to make the membrane hydrophilic. In an embodiment, the sulfonation treatment time may range from about 5 minutes to about 1 hour, and the sulfonation treatment temperature may range from about 50 to about 120° C. In a non-limiting example embodiment, soaking is accomplished at a temperature of about 90° C. for about 10 minutes.

To further illustrate embodiment(s) of the present disclosure, the following examples are given. It is to be understood that these examples are provided for illustrative purposes and are not to be construed as limiting the scope of embodiment(s) of the present disclosure.

Example 1

Porous Hydrophilic Membrane 1

Porous carbon fiber paper was immersed in a mixture containing 90 parts styrene, 10 parts divinyl benzene, and 4 parts photoinitiator (IRGACURE 863 which is commercially available from Ciba-Geigy Corp. located in Tarrytown, N.Y.) for about 1 minute. The coated porous carbon fiber paper was exposed to UV radiation for about 3 minutes. After curing, the sample was sulfonated in concentrated sulfonic acid at about 90° C. for about 10 minutes.

Comparative Porous Hydrophilic Membrane 2

Porous carbon fiber paper is immersed into a mixture of about 0.1 g of polyethylene glycol diacrylate, about 0.4 g of polyethylene glycol acrylate, about 1.5 ml of isopropanol, and about 0.02 g of IRGACURE 184 photoinitiator for about 1 minute. The coated porous carbon fiber paper was exposed to air for about 5 minutes to allow the isopropanol to evaporate. The coated porous carbon fiber paper was exposed to UV curing.

Figure 2:
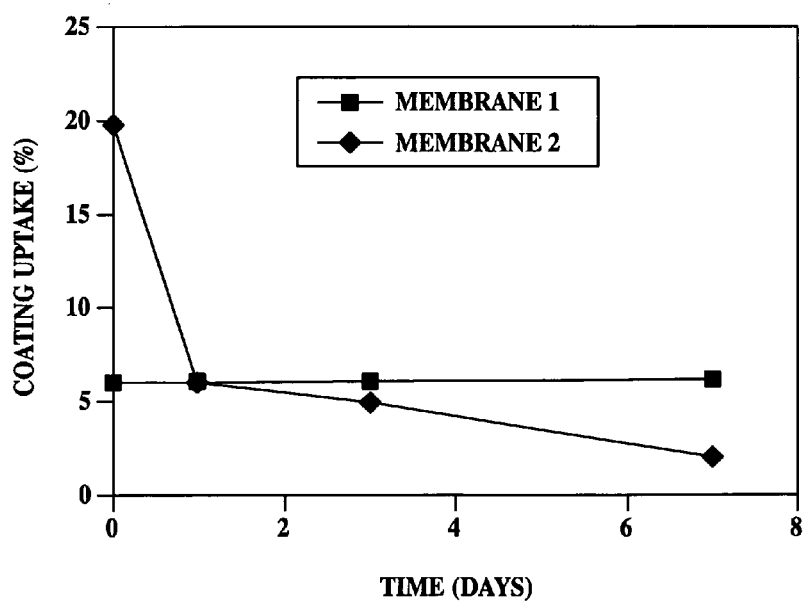
FIG. 2 is a graph depicting a comparison of the stability of an embodiment of a hydrophilic sulfonated coating as disclosed herein and a hydrophilic acrylate coating.

FIG. 2 is a graph illustrating the stability of porous hydrophilic membranes 1 and 2. An accelerated test was used to evaluate the stability of the respective membranes. The test included soaking membranes 1 and 2 in 90° C. water over 7 days. Prior to taking measurements, the samples were baked at about 90° C. in a dry oven for about 30 minutes to substantially remove the water. The membranes were weighed to determine the remaining uptake of the coating. The hydrophilicity was evaluated semi-quantitatively by the water wicking speed.

As depicted in FIG. 2, membrane 2 experienced coating loss after being subjected to the accelerated test over time. Over the same time period, the uptake of membrane 1 remained constant. Membrane 2 exhibited immediate water wicking at 0 days, however, after 7 days of testing, it exhibited water wicking after two minutes. This illustrates that membrane 2 gradually lost hydrophilicity as the accelerated tests progressed. In contrast, membrane 1 exhibited immediate water wicking during the entire accelerated testing period (0 to 7 days).

Example 2

Due to the porous natures of both porous hydrophilic membranes 1 and 2 (formed in Example 1), water droplets generally do not stay in droplet form on the membrane surface, rather they wick through the membranes. This generally makes it difficult to quantitatively compare the hydrophilicity of the membranes via direct contact angle measurements. Non-porous hydrophilic surfaces 1 and 2 were formed having the same surface chemistry of porous hydrophilic membranes 1 and 2, respectively, so that direct contact angle measurements could be taken.

Non-porous Hydrophilic Surface 1

A resin pellet was made by thermal polymerization of a mixture containing 90 parts styrene, 10 parts divinyl benzene, and 4 parts benzoyl peroxide in a glass vial at about 80° C. for about 8 hours. After the thermal curing, the pellet was sulfonated in concentrated sulfonic acid at about 90° C. for about 10 minutes.

Comparative Non-porous Hydrophilic Surface 2

A resin pellet was made by thermal polymerization of about 0.1 g polyethylene glycol diacrylate, about 0.4 g of polyethylene glycol acrylate, and about 2 wt. % benzoyl peroxide in a glass vial at about 80° C. for about 8 hours.

The direct contact angle of non-porous hydrophilic surface 1 was lower than 10, and the direct contact angle of non-porous hydrophilic surface 2 was between about 30 and about 40. The lower contact angle of non-porous hydrophilic surface 1 (when compared to that of surface 2) indicates that the sulfonated surface formed via embodiment(s) of methods of the present disclosure is substantially more hydrophilic than membranes formed via previously known methods (those used in the comparative examples).

While several embodiments have been described in detail, it will be apparent to those skilled in the art that the disclosed embodiments may be modified. Therefore, the foregoing description is to be considered exemplary rather than limiting.

The invention claimed is:

1. A method for forming a hydrophilic porous carbon fiber paper, comprising:
    applying a crosslinked coating to a hydrophobic porous carbon fiber paper via an in-situ polymerization process without solvent to provide a crosslinked coating formed on the hydrophobic porous carbon fiber paper; and
    thereafter, soaking the crosslinked coating formed on the hydrophobic porous carbon fiber paper with concentrated sulfonic acid at a temperature ranging from about 50° C. to about 120° C. for a time ranging from about 5 minutes to about 1 hour to add sulfonic acid groups to the crosslinked coating to provide a hydrophilic porous carbon fiber paper.

2. The method as defined in claim 1 wherein applying the crosslinked coating to the hydrophobic porous carbon fiber paper includes:
    immersing the hydrophobic porous carbon fiber paper in a monomer-containing mixture for about 1 minute; and
    initiating in-situ polymerization of the monomer-containing mixture.

3. The method as defined in claim 2 wherein initiating polymerization is accomplished via ultraviolet radiation exposure, thermal exposure, or combinations thereof.

4. The method as defined in claim 2 wherein the monomer-containing mixture comprising at least one monomer comprising at least one of styrene, trifluorostyrene, acrylates, itaconates, or methacrylates.

5. The method as defined in claim 2 wherein the monomer-containing mixture further includes a crosslinker.

6. The method as defined in claim 1 wherein the crosslinked coating includes a polymer comprising at least one of vinyl polymers, or condensation polymers.

7. A method of making fuel cell gas diffusion paper with improved water wicking capability by forming a hydrophilic porous fiber paper comprising:
    immersing a hydrophobic porous carbon fiber paper in a mixture including a non-hydrophilic monomer and a crosslinker, the carbon fiber paper having pores ranging in size from about 0.1 to about 100 microns capable of wicking water through the paper;
    initiating in-situ polymerization of the mixture without solvent by exposing the hydrophobic porous carbon fiber paper to UV radiation, thereby forming a crosslinked coating on the hydrophobic porous carbon fiber paper without substantially blocking the pores; and
    thereafter, sulfonating the crosslinked coating comprising soaking the coated hydrophobic porous carbon fiber paper in concentrated sulfonic acid at a temperature ranging from about 50° C. to about 120° C. for a time ranging from about 5 minutes to about 1 hour, thereby introducing increased hydrophilicity into the coating on the porous carbon fiber paper by the addition of sulfonic acid groups to the crosslinked coating to provide a hydrophilic porous carbon fiber paper so that water readily wicks through said hydrophilic porous carbon fiber paper.

8. The method as set forth in claim 2 wherein the monomer-containing mixture includes non-hydrophilic monomers.

9. A method of making fuel cell gas diffusion paper with improved water wicking capability by forming a hydrophilic surface on a hydrophobic porous substrate, the method comprising:
    applying an evenly distributed crosslinked coating to a surface of a hydrophobic porous carbon fiber paper via an in-situ polymerization process in which the hydrophobic porous carbon fiber paper is immersed in a mixture comprising styrene monomers, divinyl benzene, a photoinitiator, and a solvent, the solvent is evaporated, and thereafter exposed to UV radiation, the carbon fiber paper having pores ranging in size from about 0.1 to about 100 microns that are capable of transporting water through the paper; and
    introducing polar functional groups into the crosslinked coating formed on the surface of the hydrophobic porous carbon fiber paper by soaking the crosslinked coating in concentrated sulfonic acid at a temperature ranging from about 50° C. to about 120° C. for a time ranging from about 5 minutes to about 1 hour to increase the hydrophilicity of the crosslinked coated hydrophobic porous carbon fiber paper by adding sulfonic acid groups to the crosslinked coating.

10. The method as defined in claim 1 wherein water readily wicks through the pores of the hydrophilic porous carbon fiber paper.

11. The method as defined in claim 1 wherein the average pore size of the porous carbon paper ranges from about 0.1 micron to about 100 microns.

* * * * *